Feb. 23, 1965 R. J. REILLY 3,170,476

PURE FLUID AMPLIFIER

Filed Aug. 22, 1962

INVENTOR
RICHARD J. REILLY
BY Alfred W. Feldman
ATTORNEY

United States Patent Office 3,170,476
Patented Feb. 23, 1965

3,170,476
PURE FLUID AMPLIFIER

Richard J. Reilly, St. Paul, Minn., assignor to Honeywell Inc., a corporation of Delaware Filed Aug. 22, 1962, Ser. No. 218,651
4 Claims. (Cl. 137—81.5)

The present invention is directed to an improved type of pure fluid amplifier, and the improvement is in the positioning of the fluid control ports to provide control streams that are more effective in their operation.

The pure fluid amplifier has become quite well known in the art, and is basically a device in which an input fluid flow is switched between two or more output channels by the application of control fluid streams at right angles to the main fluid flow. The main fluid flow attaches to a wall of an output channel of the device due to a pressure differential that exists across the fluid as it flows. There is normally a higher pressure on the outer side of the flowing fluid as it moves, than the inner side that is attached to the wall of the output channel. In order to switch this type of a device, a fluid flow is directed at 90° to the inner side of the main fluid flow thereby eventually increasing the pressure on the side that is attached to the output channel wall. As soon as this pressure becomes high enough, the fluid flow switches to the opposite channel and a pressure differential then holds the flowing fluid in the opposite channel against a wall of the opposite channel. Since the amount of fluid introduced at right angles to the main flowing fluid is small compared to the main fluid volume, the device is considered an amplifier. The gain and time response of this particular type of amplifier depends on its configuration and is quite comparable in concept to an electronic amplifier, at least as far as the concept of gain and amplificaton are concerned.

In the present invention, the conventional pure fluid amplifier having a control port oriented at 90° to the input or inlet port is altered in order to obtain an amplifier with more desirable characteristics. By changing the orientation of the input or control ports, the time response and gain of a conventional pure fluid amplifier can be improved.

It is a primary object of the present invention to disclose a pure fluid amplifier with improved characteristics due to the location of the control ports with respect to the main input port.

It is a further object of the present invention to disclose a pure fluid amplifier that is capable of being switched by a substantially smaller than ordinary signal flow to thereby improve the gain of the amplifier.

It is yet another object of the present invention to improve the time response of a fluid amplifier of the pure fluid type by orienting the input ports so that the fluid flow from the ports is more immediately effective to switch the amplifier.

It is yet another object of the present invention to disclose a pure fluid amplifier wherein substantially all of the signal flow applied to the control ports is utilized effectively.

A still further object of the present invention is to disclose a pure fluid amplifier where the signal flow is so injected as to entrain mass flow from the power stream to enhance the effect of the signal flow.

These and other objects will become apparent when the drawings are considered along with the present disclosure.

Figure 1:
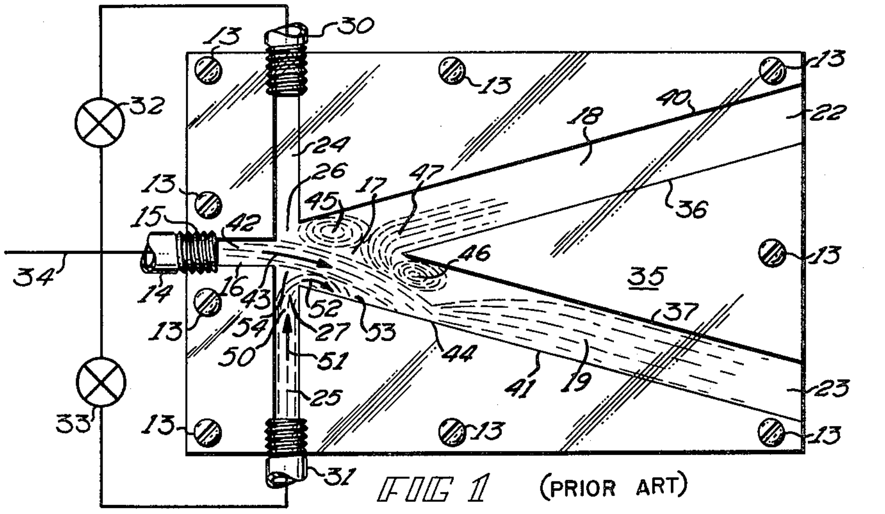
FIG 1 (PRIOR ART)
FIGURES 1 and 2 are a top view and side view of a conventional fluid amplifier.
Figure 2:
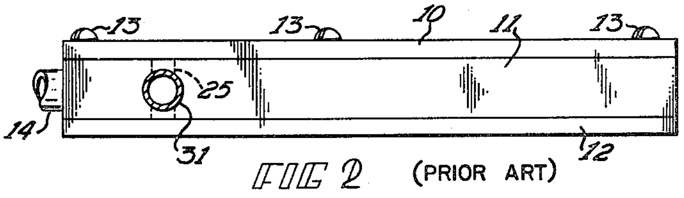
FIG 2 (PRIOR ART)

In order to appreciate the problems involved in the conventional fluid amplifier, and the improvement disclosed in the present application, FIGURES 1 and 2 disclose a conventional fluid amplifier of a prior art type. The construction of the amplifier of FIGURES 1 and 2 has been simplified in order to disclose the problem overcome by the present invention, and this simplified construction will be described in sufficient detail to understand the operation of the prior art device. The amplifier of FIGURES 1 and 2 is formed of a laminated group of plastic members 10, 11 and 12. The members 10 and 12 are nothing more than flat transparent plastic plates that form the upper and lower sides of the amplifier. The entire assembly is held together by a plurality of screws 13, and the members 10 and 12 are held in a fluidtight relationship to the center member 11. The center member 11 has an input pipe 14 threaded into it at 15 and the pipe 14 corresponds with the main fluid inlet means 16 which is in the form of a channel. The inlet means 16 opens into an outlet means 17 that in turn has two output channels 18 and 19. The channels 18 and 19 open at 22 and 23 to be connected to any device to be operated from the fluid amplifier of FIGURES 1 and 2.

A pair of channels 24 and 25 open at 26 and 27 into the output means 17 and at right angles to the input channel or input means 16. The passages 24 and 25 form the fluid control means for the device and in effect have ports at 26 and 27. The channels 24 and 25 are further supplied with their input fluids from pipes 30 and 31 that are appropriately threaded into the center member 11. In order to complete the disclosure of a simple amplifier, the pipes 30 and 31 are each fed through control valves 32 and 33 from a common fluid source 34 that is also connected to pipe 14. The fluid supplied to the present device can be of any type such as a gas, a liquid, a mixture of a gas and a liquid or any other type of fluid that can be moved under a pressure differential. The fluid amplifier of FIGURES 1 and 2 is further characterized by having a center splitter 35 that forms two walls 36 and 37 of the channels 18 and 19. The channels 18 and 19 further have outer walls 40 and 41. The outer walls 40 and 41 are of importance in operation of the present device and will be described below.

The fluid supplied to pipe 34 is conducted by pipe 14 to the input means 16 and a continuous flow of fluid is provided as is shown by the shading at 42. An arrow 43 indicates the general direction of the fluid flow. In the present device, the fluid flow 42 strikes the wall 41 at 44 and then diffuses generally into the output channel 19. A group of flow turbulences and vortexes exist at 45, 46 and 47. The flow patterns disclosed have been determined in numerous flow visualization studies run on the present type of device. The fluid flow 42 remains attached to wall 41 of the output channel 19 by a pressure differential that exists across the flow. The pressure on the outer side is greater than the pressure on the side adjacent the control port 27, and this pressure differential holds the flow 42 against the wall 41 until such time as the pressure differential across the flow is disturbed.

In order to switch the conventional fluid amplifier shown in FIGURES 1 and 2, a control flow, which has been shaded in at 50, is provided. The direction which this flow takes is represented by arrows 51 and 52. When the valve 33 is opened initially, a fluid flows from the common supply 34 to the pipe 31 and then into channel 25. The initial tendency of this fluid flow is to pass out of the control port 27 and then be entrained at 53 along the side of the main fluid flow 42. This leaves a small area 54 that is substantially free of any control fluid and still allows a pressure differential to exist across the flow 42 to hold the flow 42 against the wall 41. As the flow coming in pipe 31 increases and the space 54 is filled with fluid, the fluid amplifier disclosed in FIGURES 1 and 2 switches so that the flow 42 moves against the wall 40 and attaches to the wall 40 in the same manner as the flow was initially attached to the wall 41.

The operation thus described has been studied in detail by means of pressure readings along the walls of the fluid amplifier, as well as, in the previously mentioned flow visualization studies. It will be noted that the initial flow from the control port 27 is not effective in switching the fluid amplifier, but merely is entrained with the main fluid flow and is taken out as an additional main fluid flow as opposed to a switching signal. As the pressure builds up at the port 27, the amplifier eventually switches. It should be noted that in the conventional fluid amplifier, there is therefore a substantial time delay and loss in each switching operation.

Figure 3:
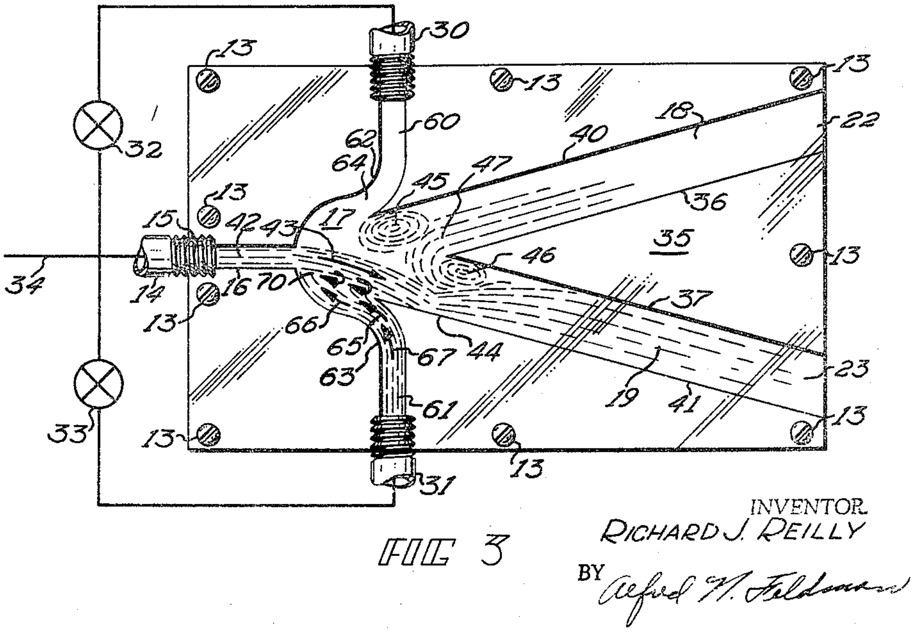
FIGURE 3 is a top view of the improved configuration of fluid amplifier.

The present invention, as embodied in FIGURE 3, overcomes the time delay and loss that is normally entailed in breaking down the pressure differential which exists across the flowing fluid. This novel configuration and its mode of operation will be described in detail. A similar construction of a laminated nature is utilized for the construction of FIGURE 3 but only a top view of the device is disclosed. The device has an inlet pipe 14 that is threaded at 15 into an input means 16 and again an output means 17 is provided operating into a pair of channels 18 and 19. Channels 18 and 19 have outlets 22 and 23 and the entire unit is held together by a plurality of screws 13. In the present device, a pair of control channels 60 and 61 are provided that are connected to pipes 30 and 31. The pipes 30 and 31 are in turn connected back through valves 32 and 33 to the common source 34 so that fluid can be supplied to pipe 14 and pipes 30 and 31 in the same fashion as was disclosed in connection with FIGURES 1 and 2. The channels 18 and 19 are again separated by the divider 35 that provides walls 36 and 37. The amplifier further has walls 40 and 41 as did the amplifier disclosed in FIGURES 1 and 2. The amplifier construction is generally similar between the two disclosed versions except in the area of the output means 17, and this area will be described in detail.

The input control channel 60 is curved at 62 and input control channel 61 is curved at 63. The input channels 60 and 61 have input control ports 64 and 65 that are directed into the output means 17, but it is noted that they are directed into the output means 17 at an obtuse angle to the input means 16. The input ports 64 and 65 are directed at approximately 135° to the input means 16, but this obtuse angle is not limited to the angle of 135°. The angle at which the ports 64 and 65 are directed must lie at some angle between the right angle of the prior art and 180° from the angle of input flow from the input means 16. An input flow 42 disclosed generally with arrow 43 is again supplied and the input flow 42 impinges on wall 41 at 44 and then diffuses generally into the output channel 19. A vortex 45 is again shown along with the vortex 46 associated with the separated flow around the divider 35. The pressure differential across the stream 42 exists again in the present amplifier in exactly the same fashion as it does in the prior art device disclosed in FIGURES 1 and 2.

It will be noted that if fluid is allowed to flow through valve 33 from pipe 34 through the input pipe 31 and channel 61, that the flow out of the control port 65 is generally directed in opposition to the direction of flow of the fluid stream 42. This opposition flow is generally shown by arrows 66 and 67. Due to the curvature 63 and the arrangement of the opening or control port 65 at the obtuse angle to the input flow 42, the fluid entering pipe or channel 61 is directed almost entirely in the area 70, which is the entire low pressure side of the input fluid flow 42. With the present arrangement, the initial fluid flowing from the outlet port 65 is directed into the area that forms the low pressure area of the fluid amplifier and is the area that holds the amplifier in the locked position against the wall 41 of the channel 19. Since the fluid flow 66 and 67 is in direct opposition to the fluid flow 42, the initial flow from the control port 65 is not as easily entrained in the flow coming from the input means 16. In contrast to the prior art devices, the signal flow 66 itself entrains a portion of the power stream, thus adding to the effect of the signal. Substantially more of the inlet control signal plus flow entrained from the power stream is therefore initially utilized to break down the pressure differential existing across the flow 42 that keeps the flow 42 initially locked on wall 41. With the arrangement disclosed, the present improved fluid amplifier of FIGURE 3 will switch with a smaller initial input signal from the control port 65 and the switching will occur earlier in the flow sequence than in the prior art device of FIGURES 1 and 2.

The configuration of the input control ports of the present amplifier provides an improved device, as far as gain and time response are concerned. The characteristics of the device can be altered by changing the obtuse angle existing between the input means 16 of the fluid amplifier and the control port 65. The only requirements of the present invention are that the angle be of such an obtuse nature that the initial flow from the inlet port 65 is directed into the area that constitutes the low pressure that holds the fluid flow locked on the appropriate channel wall. The exact angle of the input port 65 will vary with the desired output effect and the fluid stream used. The present invention can be altered in many ways by one skilled in the art once the principle of introducing a fluid at an angle obtuse to the input flow has been disclosed. As such, the present invention could be altered by one skilled in the art without avoiding the basic concept involved. The applicant therefore wishes to be limited in the scope of his invention, not by the specific disclosure contained in FIGURE 3, but by the appended claims.

I claim as my invention:

1. A pure fluid amplifier, including: a fluid inlet supplied with a fluid flow to be controlled; a fluid flow outlet including at least two outlet channels to receive said fluid flow upon operation of said amplifier; two control ports adjacent said fluid inlet with one port each on opposite sides of said inlet; said control ports further being adjacent said fluid flow and directed against said fluid inlet at an obtuse angle; and a control fluid flow issuing from one of said openings adjacent said inlet fluid flow and against a side of the inlet fluid flow in flow opposition thereto; said control fluid flow changing the pressures existing in said outlet across said inlet fluid flow to switch said fluid flows in said outlet to said outlet channel opposite said port from which said control fluid flow issues.

2. A pure fluid amplifier, including: a fluid inlet supplied with a fluid flow to be controlled; a fluid flow outlet having two outlet channels to alternately receive said fluid flow upon operation of said amplifier; two control ports at said fluid inlet and having openings on opposite sides of said inlet; said openings adjacent said fluid flow and directed against said fluid flow at obtuse angles; and a control fluid flow issuing from one of said openings against a side of the inlet fluid flow and in flow opposition to the inlet flow; said control fluid flow changing the pressures existing across said fluid flow to switch said fluid flows in said outlets to said outlet channel opposite said opening from which said control fluid flow issues.

3. A pure fluid amplifier, including: a fluid inlet supplied with a fluid flow to be controlled; fluid flow outlet means including two outlet channels to receive said fluid flow upon operation of said amplifier; fluid control port means adjacent said fluid inlet and having openings on opposite sides of said inlet; said fluid control port openings adjacent said fluid flow and directed against said fluid flow at an obtuse angle; and a control fluid flow issuing from one of said openings against a side of the inlet fluid flow and in flow opposition to the inlet flow; said control fluid flow changing the pressures existing across said inlet fluid flow to switch said fluid flows in said outlet means to said outlet channel opposite said opening from which said control fluid flow issues.

4. A pure fluid amplifier element, including: a fluid inlet supplied with a fluid to be controlled; fluid flow outlet means having two outlet channels; control ports adjacent said fluid inlet and each control port having an opening directed at an obtuse angle to said inlet; and a control fluid flow issuing from one of said control ports against the fluid flow from said fluid inlet; said control fluid flow changing the pressure differential existing across said fluid flow from said inlet to switch said fluid flow in said outlet means between said outlet channels.

References Cited by the Examiner

UNITED STATES PATENTS

| | | | |
|---|---|---|---|
| 2,914,916 | 12/59 | Gelin et al. | 60—35.54 |
| 3,030,979 | 4/62 | Reilly | 137—83 |
| 3,066,485 | 12/62 | Bertin et al. | 60—35.54 |
| 3,122,165 | 2/64 | Horton | 137—81.5 |

LAVERNE D. GEIGER, *Primary Examiner.*